March 3, 1931. W. F. BLEECKER 1,794,668
METHOD FOR TREATING PETROLEUM
Filed May 1, 1928
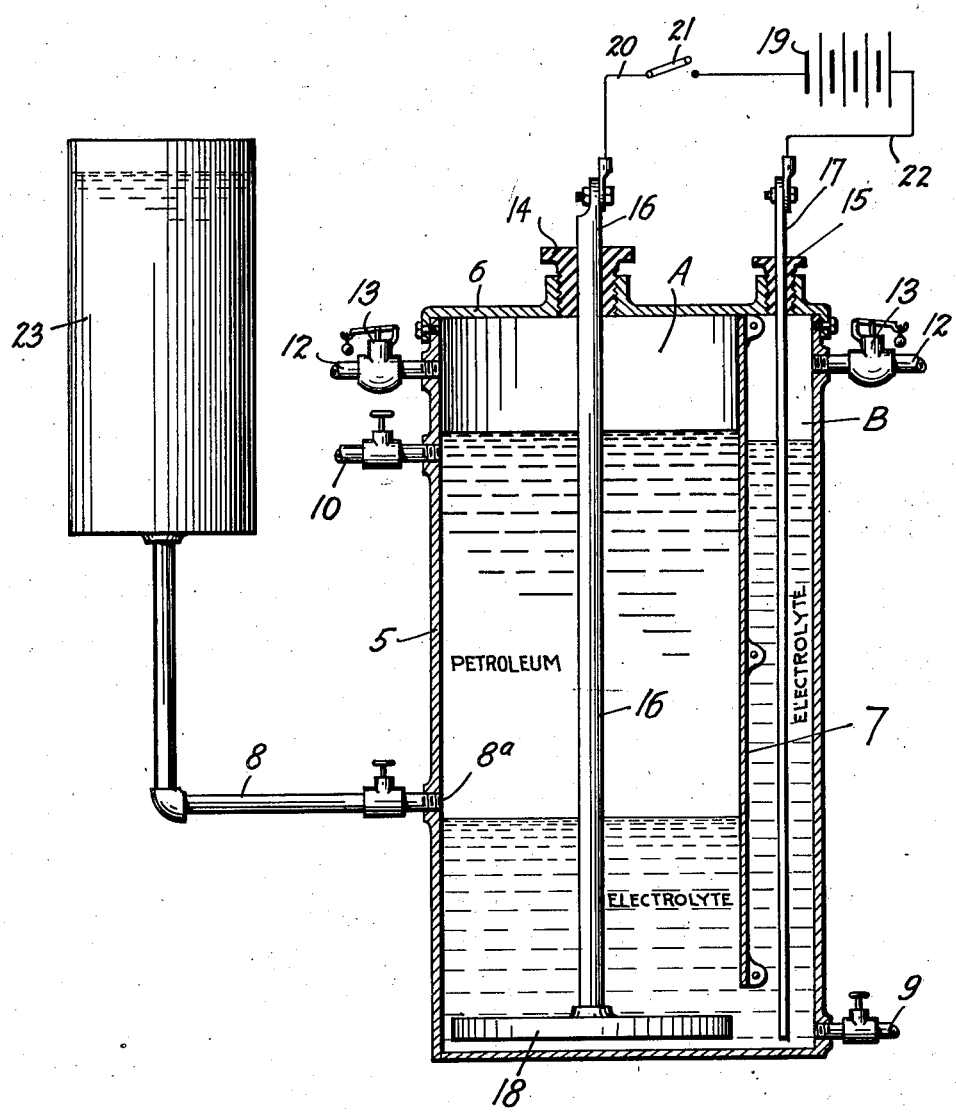
W. F. Bleecker
INVENTOR.

Patented Mar. 3, 1931

1,794,668

UNITED STATES PATENT OFFICE

WARREN F. BLEECKER, OF BOULDER, COLORADO

METHOD FOR TREATING PETROLEUM

Application filed May 1, 1928. Serial No. 274,214.

My invention relates to the treatment of petroleum containing corrosive agents.

It is an object of the invention to render inactive or neutralize the corrosiveness of certain sulfur compounds, such as hydrogen sulfide, often found in petroleum, by an oxidizing gas.

It is a further object of the invention to thoroughly mix the gas with the petroleum to be treated, and to keep the gas in same until the desired result has been obtained.

It is also an object to generate an oxidizing gas in the presence of said petroleum so that the gas while in a nascent state may mix with the petroleum.

Reference is made to my application for patent Serial No. 274,213, filed May 1, 1928, for claims on subject matter shown and/or described but not claimed herein.

The loss due to the corrosive agents in petroleum amounts to millions of dollars a year, and although many attempts have been made to find a satisfactory method of rendering such agents inactive, apparently no satisfactory method has been heretofore invented.

The corrosive sulfur compounds are volatile and foul-smelling. By reason of being volatile, they escape from the oil and, upon being condensed in the presence of air and moisture in the air, attack metals, which constitute a large part of oil handling equipment. In a metal tank of petroleum containing such compounds, particles of iron sulfide, which are formed on exposed portions of the tank by the condensed sulfur vapors, become dislodged and fall to the bottom of the tank, here electrolytic action is set up spontaneously, resulting in pitting and thus destroying the value of the tank.

Moreover, the volatile, corrosive sulfur compounds are poisonous to persons handling the oil, until treated by the present process.

My invention consists generally in mixing under pressure an oxidizing gas with petroleum containing the corrosive sulfur compounds. It is preferred to use nascent gas as its effect is more positive and quicker.

Many embodiments are possible for carrying out the foregoing invention. The gas may be generated by any suitable means or fed from a convenient source. It is preferred to generate the gas in the presence of the oil in order to utilize the gas in its nascent state as much as possible.

Oxide of chlorine is generated in the presence of the oil or petroleum and is passed therethrough, thus oxidizing the corrosive compounds.

The function of pressure, as is known in physics, is to render the gas soluble in the oil, and therefore to speed up the reaction by the intimate contact of the gas and all of the oil. The pressure may vary from slightly above atmospheric pressure to several pounds. I prefer a pressure of five to ten pounds to a square inch.

The temperature of the oil during the reaction is not important, although an increase in temperature results in slightly speeding up the reaction. The optimum range of temperature is ordinary atmospheric temperatures. The process is particularly designed for use in the oil fields without the application of heat.

The time of treatment varies from a few minutes in the case of a very reactive gas, such as chlorine or an oxide of chlorine, to several hours in the case of a less active gas such as air. The process may be operated continuously or in batches. The use of a more active gas is better suited to a continuous operation.

Heretofore chlorine has been passed through petroleum in an effort to render the sulfur compounds inactive, but no pressure other than atmospheric was used and the chlorine merely swept through the oil without being intimately intermixed. By that method a great quantity of chlorine must be used and even then the corrosiveness is only partly neutralized.

It has also been suggested heretofore that an oxidizing solution be mixed with petroleum, forming an emulsion. Objections to this method are that the solution must subsequently be separated from the petroleum by some process.

Mixing the gas with the oil by the present novel method, the mixture of the active agent with the oil is much more thorough and more intimate than when it is added in a liquid by the process of emulsification. Moreover, the oxidizing gases pass off upon exposure to the atmosphere, so that their removal is extremely simple.

The drawing is a sectional elevation of a system adapted to carry out the present process.

The reference numeral 5 designates a treatment tank having a cap or closure 6 rendering the tank air tight. A partition 7 extends across the tank to a point below the level of the electrolyte hereafter described, thus providing two compartments A and B separated from each other except for a passage below the partition.

The tank has an oil inlet 8a to which is connected an oil inlet conduit 8. An inlet conduit 9 is provided for an electrolyte hereinafter described, and an outlet conduit 10 is provided for oil in which the corrosive sulfur compounds have been rendered inactive. Each of the compartments has a gas escape conduit 12 that has a blow off valve 13 to automatically regulate the escape of accumulated gases in the compartments. The other conduits are likewise provided with suitable valves.

The electrolyte inlet conduit 9 is preferably near the bottom of the tank; the oil inlet conduit 8 just above the level of the electrolyte; the oil outlet conduit 10 near the level of the oil and the gas escape conduits 12 near the top of the compartments.

The cap 6 carries insulating plugs 14 and 15 above compartments A and B respectively. Passing through the plugs and thereby insulated from the cap and tank are an inert anode 16 and a cathode 17 depending from the cap and extending into the electrolyte in compartments A and B respectively. The anode 16 preferably has a large area provided by a plate 18 parallel to the bottom of the tank.

A source of direct current is shown at 19, which is suitably connected with the anode by a wire 20 having a switch 21 and with the cathode by a wire 22.

The oil may be fed from any suitable source providing there is sufficient pressure to overcome the pressure in the tank, and by any suitable means. In the drawing a gravity tank 23 is shown as an example. The gravity tank contains the oil to be treated and is of such altitude above the oil inlet 8a of the treatment tank 5 that the pressure in the treatment tank is overcome. The gravity tank is connected with the oil inlet conduit 8.

In the operation of the present invention, an electrolyte is introduced into the tank 5 by means of the conduit 9 and finds its level in the compartments A and B. Any electrolyte is used which is capable of being decomposed with oxygen or a gaseous oxide as a product, for example brine that is preferably alkaline and in some cases dilute sulphuric acid may be used to advantage. By brine is meant water strongly impregnated with sodium chloride. Enough electrolyte is used to keep the passage under the partition 7 filled at all times with electrolyte, irrespective of the head of oil in the tank 5.

The optimum concentration of the electrolyte is that which produces the greatest quantity of gas per unit of electric energy, although any concentration of electrolyte will produce gas to some degree. More specifically, by experiment it appears that 150 to 250 grams of common salt (sodium chloride) per liter of water is the range of optimum concentration.

The oil to be treated is then fed into the compartment A through the conduit 8. The oil rests on top of the electrolyte and is thus kept from the compartment B.

The switch 21 is then closed, causing electrolysis of the electrolyte. If brine be used, chlorine in the form of a gas combined with oxygen (oxide of chlorine) rises from the anode and passes into the oil. If caustic soda or dilute sulphuric be used, oxygen alone is evolved at the anode. Both the oxygen and the chlorine react in destroying the undesirable corrosive compounds in the oil.

Hydrogen gas in all cases is generated at the cathode, which rises directly up in the compartment B. The hydrogen gas does not pass through the oil, thus avoiding any effect of the hydrogen gas on the oil.

The gases that accumulate in the spaces at the top of the compartments increase the pressure in the tank, which, as stated, causes the oxidizing gas in compartment A to mix thoroughly with the oil with the desired result.

Excess gases will pass out through the escape conduits 12 past the blow-off valves 13, which regulate the pressure automatically at all times.

The sweetened oil is removed by means of the conduit 10, there being only slight traces of the chlorine left in the sweetened oil.

Oil treated as explained, no longer contains volatile, foul-smelling, corrosive sulfur compounds, and may be handled by human beings without danger of poison and will not corrode metals.

In this specification "oxidizing" merely means converting corrosive sulfur compounds to non-corrosive sulfur compounds, or neutralizing the corrosiveness of corrosive sulfur compounds, or both. The literature on the subject appears to use this term in this connection.

"Oil" and "petroleum" are used interchangeably in the present specification. Where either occurs, I desire it to be understood that the broadest meaning of either word is meant. Moreover, either term also includes the products of petroleum such as gasoline, etc.

It is to be understood that chlorine gas as used in the present specification is a generic term, one species of which is oxide of chlorine and that oxide of chlorine is an equivalent of chlorine gas.

Having thus described my invention what I claim and desire to secure by Letters Patent is:

1. The process of removing corrosive sulphur compounds from petroleum, comprising the electrolyzing of brine in the presence of the petroleum, thereby producing chlorine and hydrogen, allowing the nascent chlorine to pass directly into the petroleum, and separately removing hydrogen gas generated by the electrolysis, without introducing it into the petroleum.

2. The process of removing corrosive sulphur compounds from petroleum, comprising electrolyzing, in the presence of the petroleum, an electrolyte capable of producing an oxidizing gas and hydrogen, allowing the nascent oxidizing gas produced thereby to pass directly into the petroleum, and separately removing the hydrogen, without introducing it into the petroleum.

3. The process of removing corrosive sulphur compounds from petroleum, comprising electrolyzing, in the presence of the petroleum, an electrolyte capable of producing an oxidizing gas and hydrogen, allowing the nascent oxidizing gas produced thereby to pass directly into the petroleum, maintaining the oxidizing gas in the petroleum thereby increasing the pressure as the amount of oxidizing gas increases, and separately removing the hydrogen, without introducing it into the petroleum.

In testimony whereof I have affixed my signature.

WARREN F. BLEECKER.